(12) United States Patent
Chen et al.

(10) Patent No.: US 11,650,135 B2
(45) Date of Patent: May 16, 2023

(54) MULTI-DIMENSIONAL SPACE LOAD AND FIRE TEST SYSTEM FOR TUNNEL STRUCTURE, AND METHOD FOR IMPLEMENTING SAME

(71) Applicant: CHINA UNIVERSITY OF MINING AND TECHNOLOGY, Jiangsu (CN)

(72) Inventors: Wei Chen, Jiangsu (CN); Jihong Ye, Jiangsu (CN); Jian Jiang, Jiangsu (CN); Rui Li, Jiangsu (CN); Chunjin Lin, Shandong (CN); Mengtian Li, Shandong (CN)

(73) Assignees: China University of Mining and Technology, Jiangsu (CN); Shangdong University, Shandong (CN)

( * ) Notice: Subject to any disclaimer, the term of this patent is extended or adjusted under 35 U.S.C. 154(b) by 0 days.

(21) Appl. No.: 17/923,645

(22) PCT Filed: Jan. 28, 2022

(86) PCT No.: PCT/CN2022/074548
§ 371 (c)(1),
(2) Date: Nov. 7, 2022

(87) PCT Pub. No.: WO2022/179383
PCT Pub. Date: Sep. 1, 2022

(65) Prior Publication Data
US 2023/0122718 A1    Apr. 20, 2023

(30) Foreign Application Priority Data
Feb. 25, 2021 (CN) .......................... 202110211756.0

(51) Int. Cl.
*G01M 5/00* (2006.01)
*G01M 99/00* (2011.01)

(52) U.S. Cl.
CPC ........ *G01M 99/002* (2013.01); *G01M 5/0058* (2013.01)

(58) Field of Classification Search
CPC .......................... G01M 99/002; G01M 5/0058
See application file for complete search history.

(56) References Cited

U.S. PATENT DOCUMENTS 4,237,182 A * 12/1980 Fulmer .................... C09D 5/18
  428/305.5
8,289,327 B1 * 10/2012 Horvath .................. G06T 13/60
  345/428

(Continued)

FOREIGN PATENT DOCUMENTS

| CN | 106652724 | 5/2017 |
|---|---|---|
| CN | 106770903 | 5/2017 |

(Continued)

OTHER PUBLICATIONS

International Search Report & Written Opinion, International Patent Application No. PCT/CN2022/074548, dated May 6, 2022, 8 total pages.

*Primary Examiner* — Max H Noori
*Assistant Examiner* — Masoud H Noori
(74) *Attorney, Agent, or Firm* — Casimir Jones, S.C.; Brian F. Bradley

(57) ABSTRACT

A multi-dimensional space load and fire test system for a tunnel structure, which includes a multi-point loading self-balancing reaction force system having a rigid platform, two furnace body side-sealing apparatuses (22) and a model assembly and transport apparatus (23) for transporting and situating a tunnel model are on a track on the rigid platform (9), the two furnace body side-sealing apparatuses (22) are respectively used for sealing two end openings of the tunnel model, a tower-type combustion vehicle can be placed within an inner cavity of the tunnel model, a plurality of sets (Continued)

of evenly distributed self-adaptive loading apparatuses (3) used for exerting loading forces on an outer wall of the tunnel model are connected between two reaction force frames (1) of the multi-point loading self-balancing reaction force system. The present system is able to perform loading on tunnel models having different cross section shapes, can be adapted to testing requirements of tunnel structures having different cross section shapes, and with respect to tunnel structure fire testing in particular, a camera of the present system has a large imaging angle of view, the present invention has good heat resistance, possesses both terminal imaging and distance measurement, and can amply satisfy a use requirement for the high temperature environment of a tunnel fire.

10 Claims, 10 Drawing Sheets

(56) References Cited

U.S. PATENT DOCUMENTS

| | | | | |
|---|---|---|---|---|
| 9,613,432 | B2* | 4/2017 | Buemi | G08B 17/125 |
| 11,579,055 | B2* | 2/2023 | Li | G01M 5/0091 |
| 2001/0029750 | A1* | 10/2001 | Kotliar | A62C 3/0221 |
| | | | | 62/640 |
| 2001/0038334 | A1* | 11/2001 | Magerle | G08B 17/00 |
| | | | | 340/506 |
| 2002/0023762 | A1* | 2/2002 | Kotliar | B01D 53/22 |
| | | | | 62/640 |
| 2012/0193110 | A1* | 8/2012 | Bouthors | B61L 27/53 |
| | | | | 169/56 |
| 2014/0338927 | A1* | 11/2014 | Palle | A62C 35/60 |
| | | | | 169/16 |
| 2017/0165510 | A1* | 6/2017 | Torres Muñoz | A62C 3/025 |
| 2019/0383714 | A1 | 12/2019 | Li et al. | |
| 2021/0208554 | A1* | 7/2021 | Yan | G05B 17/02 |
| 2021/0215604 | A1* | 7/2021 | Matsuda | G01N 33/006 |

FOREIGN PATENT DOCUMENTS

| | | |
|---|---|---|
| CN | 206574374 | 10/2017 |
| CN | 107421761 | 12/2017 |
| CN | 109406184 | 3/2019 |
| CN | 112945575 | 6/2021 |
| CN | 113008685 | 6/2021 |
| CN | 113009067 | 6/2021 |

* cited by examiner

MULTI-DIMENSIONAL SPACE LOAD AND FIRE TEST SYSTEM FOR TUNNEL STRUCTURE, AND METHOD FOR IMPLEMENTING SAME

TECHNICAL FIELD

The present disclosure relates to the field of a fire testing system for a tunnel structure, in particular to a fire testing system having loading within a multi-dimensional space for a tunnel structure and an implementing method thereof.

BACKGROUND

With the advancement on industrialization and urbanization in China. The development and utilization of China's traffic tunnels (highways, railways, subways, subsea tunnels, and the like.) have entered a rapid growth stage. Although tunnel traffic brings us convenience, tunnel fire accidents tend to cause serious losses due to their characteristics such as rapid spread, difficult control and high risk. Tunnel structures is in the state of confining pressure stress during the daily operation process, so it is of great significance for the design and operation safety of the tunnels to evaluate their bearing capacities. Generally, the bearing capacities of the tunnel test models can be tested by the reaction loading systems. However, with the diversification of tunnel uses, the tunnel section shapes are constantly updated (circular, rectangular, horseshoe, elliptical, polygonal, double circular combined section, and the like.). The existing reaction force loading systems are generally only applicable to the loadings of circular cross-section tunnel models, which is difficult to satisfy the test requirements for tunnel structures with different cross-section shapes.

In addition, common fire tests for the tunnel structures often ignites a car that is about to be scrapped to carry out the experiment. On one hand, this test method wastes resources and causes great pollution, and on the other hand, the combustion process of the test is uncontrollable and it is difficult to simulate the impact of mobile fires in automobiles. In addition, it is necessary to use cameras and a thermal imaging apparatuses to acquire test data and image data during the fire tests. Common high-temperature cameras and thermal imagers are generally needed to place outside the high-temperature environment of the fires (i.e. room temperature environment), and indirectly imaged through the lens assembly extending into the high-temperature environment of the fires. The disadvantages of such high-temperature cameras and thermal imagers are that the imaging angles are narrow, and it is difficult to possess both thermal imaging and distance measurement, so it can not satisfy the use requirements for the high-temperature environment of the tunnel fires.

SUMMARY

For the above technical deficiencies, the objectives of the present disclosure are to provide a fire testing system having load within a multi-dimensional space for a tunnel structure and an implementing method thereof, which is able to perform loading on tunnel models having different cross section shapes, can be adapted to testing requirements of tunnel structures having different cross section shapes, and with respect to tunnel structure fire testing in particular, a camera of the present system has a large imaging angle of view, the present disclosure has good thermal resistance, possesses both thermal imaging and distance measurement, and can satisfy a use requirements for the high temperature environment of a tunnel fire.

In order to solve the above-mentioned technical problems, the following technical solutions are adopted in the present disclosure.

Provided in the present disclosure is a fire testing system having load within a multi-dimensional space for a tunnel structure. The system includes a multi-point loading self-balancing reaction force system provided with a rigid platform. Rail channels are arranged on the rigid platform and rails are laid in the rail channels. A slidable model assembly and transport apparatus and two furnace body side-sealing apparatuses are arranged on the rails. An upper end of the model assembly and transport apparatus is configured to place a tunnel model. The two furnace body side-sealing apparatuses are configured to seal both end openings of the tunnel model respectively. A steel rail is arranged on an inner wall of the tunnel model, and a tower-type combustion vehicle capable of projecting a flame outwards is arranged on the steel rail. The multi-point loading self-balancing reaction force system includes two reaction force frames arranged in parallel to each other on the rigid platform. A plurality of uniformly distributed sets of self-adaptive loading apparatuses configured to apply loading forces to an outer wall of the tunnel model are connected between the two reaction force frames. Loading ends of the self-adaptive loading apparatuses are capable of freely adjusting spatial locations. The reaction force frames are in an annular shape and are formed by connecting a plurality of segments of steel members through bolts. Each of the furnace body side-sealing apparatuses is provided with an air inlet pipe, a wind inlet pipe, a water inlet pipe and a water outlet pipe, respectively.

Each of the self-adaptive loading apparatuses includes a distribution beam. A plurality of uniformly distributed hydraulic cylinders are hinged on an upper end surface of the distribution beam. One end of each of the hydraulic cylinders away from the distribution beam is fixed to a bottom portion of an adjustment platform. An electric pushing rod and two fixing rods symmetrically arranged on both sides of the electric pushing rod are fixed on a top surface of the adjustment platform. The fixing rods and the electric pushing rod are slidably connected with an rotating block. Two rotating rods are symmetrically fixed on two ends of the rotating block. One end of each of the two rotating rods away from the rotating block is pinnedly connected into a pin hole preset on each of the two reaction force frames respectively.

Each of the self-adaptive loading apparatuses further includes an angle adjusting assembly configured to adjust an rotation angle of the rotating block and a locking assembly configured to limit displacing of the distribution beam in a direction of the fixing rods. A plurality of hydraulic supporting cylinders are arranged on an upper end surface of the rigid platform. Each of the hydraulic cylinders and each of the hydraulic supporting cylinders are connected to a hydraulic power station in an oil-way through a respective one of oil distribution stations, respectively.

Preferably, the angel adjusting assembly includes an adjusting top rod, a middle portion of the adjusting top rod is connected to a middle portion of an adjusting bottom rod through a first telescopic rod. Both ends of the adjusting top rod are slidably inserted into grooves preset on the two reaction force frames respectively. The adjusting bottom rod is fixedly connected to the rotating block. The first telescopic rod drives the rotating block to rotate through a stretch and contraction of the first telescopic rod. The electric pushing rod and the first telescopic rod are electrically controlled and are provided with a wireless receiving unit and a control unit controlling operations of the electric pushing rod and the first telescopic rod, respectively.

Preferably, the locking assembly includes an L-shaped fixing frame fixed on the rotating block. One end of the L-shaped fixing frame away from the rotating block is fixedly connected to a second telescopic rod. An extended end of the second telescopic rod is fixedly connected to a rigid wedge. A side surface of each of the fixing rods facing the electric pushing rod is provided with a plurality of uniformly arranged grooves. Two sides of the rigid wedge are capable of being embedded into the grooves to function with position locking with respect to the distribution beam. A middle portion of the rigid wedge is provided with a notch capable of accommodating the electric pushing rod. The second telescopic rod is electrically controlled and is provided with a wireless receiving unit and a control unit controlling an operation of the second telescopic rod, respectively.

Preferably, a hydraulic cylinder load sensor and a hydraulic cylinder displacement sensor are arranged on loading ends of the hydraulic supporting cylinder and the hydraulic cylinder, respectively. A hydraulic cylinder proportional valve is arranged between the hydraulic cylinder and the hydraulic supporting cylinder, and corresponding oil distribution stations respectively, to implement a respective independent hydraulic supply.

Preferably, the tower-type combustion vehicle includes a vehicle body. A plurality of combustion ports uniformly arranged in a rectangular array are arranged on two side surfaces and a top surface of the vehicle body, respectively. A plurality of sliding frames corresponding to the combustion ports one-to-one respectively are fixed on an inner wall of the vehicle body. Sliding plates are slidably connected with the sliding frames and are fixedly connected with combustion cylinders of combustors. Flame projecting ends of the combustion cylinders pass through the sliding plates, the sliding frames and the combustion ports, and protrude from the vehicle body. The combustion cylinders are capable of swinging up and down for projecting through sliding the sliding plates on the sliding frames. Air inlet holes and wind inlet holes on the combustors are in communication with each other through the air inlet pipes and the wind inlet pipes of the furnace body side-sealing apparatuses, and heat-resistant hoses, respectively. The air inlet pipes and the wind inlet pipes are externally connected to an external gas and a wind source respectively. A plurality of high-temperature-resistant panoramic detection apparatuses are arranged an outer wall of the vehicle body. The panoramic detection apparatuses are electrically connected with an external monitor. The monitor is externally connected to a Virtual Reality (VR) apparatus. An inspection port capable of accommodating a maintenance personnel for access is arranged on one end of the vehicle body.

Preferably, each of the sliding frames includes a wall plate fixed on an inner wall of the vehicle body. An arc-shaped plate is fixed on a side of the wall plate away from the inner wall of the vehicle body. Side plates are fixed between arc-shaped edges on two sides of the arc-shaped plate and the wall plate for sealing. A respective one of the sliding plates is slidably connected to a side surface of the arc-shaped plate away from the wall plate through arc-shaped sliding rails. An anti-sliding locking apparatus configured to limit displacing of the sliding plate is further arranged on the sliding plate. The wall plate, the arc-shaped plate and the sliding plate are provided respectively with a slot that is adapted and in communication with a respective one of the combustion ports and is configured for a respective one of the combustion cylinders to pass through. The sliding plate is fixedly connected to a bottom portion of the combustion cylinder. A portion of the sliding plate covering the arc-shaped plate has a same curvature as the arc-shaped plate.

Preferably, each of the panoramic detection apparatus includes a high-temperature-resistant spherical glass cover, the high-temperature-resistant spherical glass cover is fixed on a pedestal by a high-temperature-resistant clamp sleeved at a bottom portion of the spherical glass cover. A waterproof 360-degree camera is arranged in the high-temperature-resistant spherical glass cover. The waterproof 360-degree camera is fixed on an upper end surface of the pedestal through a waterflow separator arranged vertically. Two side edges of the waterflow separator abut on an inner wall of the high-temperature-resistant spherical glass cover. A space between the waterproof 360-degree camera and the pedestal is divided into a left cavity and a right cavity through the waterflow separator. A distance-measuring thermal imager (4-3) is further arranged in the right cavity and is fixed on one end of an endoscope, and another end of the endoscope is a peeping end and protrudes from the high-temperature-resistant spherical glass cover. The left cavity and the right cavity are respectively in communication with the water inlet pipe and the water outlet pipe on a respective one of the furnace body side-sealing apparatuses through the heat-resistant hoses. The water inlet pipe and the water outlet pipe are in communication with an external cooling pool. A thermal insulating cover is further arranged on a bottom portion of the pedestal. A tiny microphone and an electric motor are fixed in an inner cavity of the thermal insulating cover. A bottom portion of the thermal insulating cover is fixed on the vehicle body. The waterproof 360-degree camera, the distance-measuring thermal imager, the tiny microphone and the electric motor are electrically connected with the external monitor respectively. The monitor is externally connected with the Virtual Reality apparatus. A protruding shaft of the electric motor is inserted into and fixed at a center of the pedestal. And the pedestal is driven to rotate clockwise or counterclockwise by a forward or a reverse rotation of the electric motor.

Preferably, a front end of a gas main pipe is connected to the gas. A gas main valve, a pressure gauge, a flowmeter and a gas control main valve are arranged on the gas main pipe in sequence from front to rear. A plurality of gas sub pipes are branched from a bottom end of the gas main pipe. Each of the gas sub pipes is provided with a gas control sub valves. The air inlet holes in a same row of the combustors in the vehicle body are connect to one gas sub pipe through metal hoses. The gas main valve, the pressure gauge, the flowmeter, the gas control main valve and the gas control sub valve are electrically connected to an external gas control panel. The gas control panel is electrically connected to the monitor. The gas sub pipe is in communication with the inlet air hole of the combustor after passing through the inlet air pipe of a respective one of the furnace body side-sealing apparatuses.

The gas control main valve is a V-shaped-notch ball valve. The gas control main valve is driven pneumatically. A valve positioning of the gas control main valve is controlled by an analog output signal from a control system of the monitor. A positive displacement flowmeter is adopted as the flowmeter. The flowmeter includes a frequency pulse counter, two thermistor temperature probes and two pressure sensors. The thermistor temperature probes and the pressure sensors are arranged in pairs at an inlet and an outlet of the flowmeter (5-5) respectively.

Preferably, the model assembly and transport apparatus includes a model assembling platform and a model carrier loader that are arranged up and down with respect to each other. The model assembling platform is made of steel structure components and is provided with an arc-shaped component adapted with the tunnel model at an upper end of the model assembling platform. The model carrier loader is connected to a bottom portion of the model assembling platform by bolts, and the model carrier loader is electrically driven.

Provided in the present disclosure is further a method for implementing a fire testing system having loading within the multi-dimensional space for the tunnel structure. The method specifically includes the following steps.

In Step 1, a model assembling platform is hoisted to an upper portion of a model carrier loader, and the model assembling platform is connected with the model carrier loader by bolts. A tunnel model is hoisted to the model assembling platform in pieces by a bridge crane and the tunnel model is completed to be assembled on the model assembling platform. A hydraulic power station is controlled by a console. A wireless transmitting unit adapted with wireless receiving units on a first telescopic rod, an electric pushing rod and a second telescopic rod is arranged on the console.

In Step 2, the model carrier loader is transported to an inner cavity of two reaction force frames along rails. A plurality of hydraulic supporting cylinders located outside wheels of the model carrier loader are lifted to a lower surface of the model assembling platform after transporting the tunnel model to a preset testing position, and then the hydraulic supporting cylinders are locked.

In Step 3, the model carrier loader is separated from the model assembling platform. The model carrier loader is moved out of the test working position. A plurality of hydraulic supporting cylinders located inside the wheels of the model carrier loader are lifted to a lower surface of the model assembling platform, and then the hydraulic supporting cylinders are locked.

In Step 4, a signal is emitted by the console to control stretch and contraction of the first telescopic rod according an angel requirement on loading points of the test model to thus drive the rotating block to rotate, thereby adjusting an angle of the self-adaptive loading apparatus through an angel adjusting assembly on a self-adaptive loading apparatus.

In Step 5, a signal is emitted by the console after adjusting the angle according to a dimension of the test model to control the stretch and contraction of the electric pushing rod, thereby moving a distribution beam along a direction of fixing rods through a distance adjusting assembly to adjust a distance.

In Step 6, a signal is emitted by the console after adjusting the distance to control and push a rigid wedge out through the second telescopic rod, and the rigid wedge is inserted into grooves on the fixing rods, thereby implementing a locking function of loading positions through a locking assembly.

In Step 7, loading ends of a plurality of hydraulic cylinders on the distribution beams are controlled to extend, a preloading and a formal loading on the tunnel model are performed by the distribution beams, the distribution beams are flexibly connected to the tunnel model.

In Step 8, a tower-type combustion vehicle is driven into the tunnel model along steel rails. After the tower-type combustion vehicle reaches a preset position, two furnace body side-sealing apparatuses are respectively moved at two reaction force frames along the rail. After completing a fire protection and a heat insulation, the two furnace body side-sealing apparatuses are closed, the two furnace body side-sealing apparatuses are inserted into two end openings of the tunnel model, and a fire temperature filed is applied to an interior of the tunnel model to perform a fire test.

The beneficial effects of the present disclosure lie in the following.

1. The present disclosure is provided with two reaction force frames in an annular shape, which is convenient to implement an engineering test for a tunnel lining structure model, moreover, the present disclosure is provided with a rigid platform at a bottom portion of the reaction force frame, so that the system can implement a self-balancing when loaded.

2. The present disclosure is provided with a self-adaptive loading apparatus, which can perform loading tests for tunnel models with different cross section shapes.

3. A tower-type combustion vehicle that can simulate an automobile fire and that can be reused is designed in the present disclosure. The gas supply of each of the combustors is adjusted by controlling the gas control main valve and the gas control sub valve, so as to implement real-time control for the flame dimension and heat release, which can be used to simulate a single or a plurality of automobile fires. At the same time, different flame injection patterns in different directions can be selected by the combustor through the rotation, so as to simulate the actual situation on the automobile fires more accurately.

4. The present disclosure is provided with a model carrier loader, which enables the apparatus to have a walking function and can be used to simulate the situation on the mobile fires in automobiles.

5. A spherical glass cover made of a high-temperature-resistant material is adopted as the protective cover of the detection apparatus in present disclosure, which implements a panoramic view window of the detection apparatus for an external observation. The spherical glass cover is filled with colorless and transparent coolant, so that the electronic equipment placed in the spherical glass cover can be directly used in the high temperature environment of the fires.

6. The present disclosure is provided with apparatuses such as a waterproof 360-degree camera, a Virtual Reality apparatus, a distance-measuring thermal imager, a tiny microphone, and integrates the functions of camera, temperature measurement, distance measurement and sound measurement, so as to implement a panoramic presentation on the high temperature environment of the fires and a non-contact monitoring on the temperature in the whole field during a whole process.

BRIEF DESCRIPTION OF THE DRAWINGS

In order to describe the technical solutions in the embodiments of the present disclosure or in the prior art more clearly, the following will briefly introduce the accompanying drawings required for describing the embodiments or the prior art. It will be apparent that the accompanying drawings in the following description merely illustrate some embodiments of the present disclosure, and those of ordinary skilled in the art may still derive other accompanying drawings from these accompanying drawings without creative efforts.

DESCRIPTION OF REFERENCE NUMERALS

Reaction force frame; 2. Distance adjusting assembly; 2-1. Electric pushing rod; 2-2. Fixing rod; 2-4. Adjustment platform; 3. Self-adaptive loading apparatus; 4. Panoramic detection apparatus; 4-1. High-temperature-resistant spherical glass cover; 4-2. Waterproof 360-degree camera; 4-3. Distance-measuring thermal imager; 4-4. Waterflow separator; 4-5. Pedestal; 4-6. Endoscope; 4-7. Thermal insulating cover; 4-8. Tiny microphone; 4-9. Electric motor; 5-1. Gas sub pipe; 5-2. Gas main pipe; 5-3 Gas main valve; 5-4. Pressure gauge; 5-5. Flowmeter; 5-6. Gas control main valve; 5-7. Gas control sub valve; 5-8. Gas control pane; 6. Hydraulic cylinder loading assembly; 6-1 Hydraulic cylinder; 6-2. Distribution beam; 7. Angel adjusting assembly; 7-1. Adjusting top rod; 7-2. Adjusting bottom rod; 7-3. First telescopic rod; 8. Locking assembly; 8-1. L-shaped fixing frame; 8-2. Second telescopic rod; 8-3. Rigid wedge; 9. Rigid platform; 9-1. Rail channel; 10. Hydraulic supporting cylinder; 11. Oil distribution station; 12. Hydraulic power station; 12-1. Ripple attenuator; 13. Rotating-shaft assembly; 13-1. Rotating rod; 13-2. Rotating block; 13-3. Rectangular hole; 13-4. Circular hole; 14. Vehicle body; 14-1. Combustion port; 14-2. Insulation cotton; 14-7. Access port; 15. Combustor; 15-1 Air inlet hole; 15-2 Wind inlet hole; 15-3 Combustion cylinder; 16. Sliding frame; 16-1 Wall plate; 16-2. Side plate; 16-3. Arc-shaped plate; 16-4. Sliding rail; 17. Gas; 19. Cooling pool; 20. Monitor; 21. Virtual Reality apparatus; 22. Sliding plate. 23. Model assembly and transport apparatus; 23-1. Model carrier loader; 23-2. Model assembly platform; 24. Console.

DETAILED DESCRIPTION OF THE EMBODIMENTS

The technical solutions in the embodiments of the present disclosure will be clearly and completely described below with reference to the accompanying drawings of the embodiments of the present disclosure. It will be apparent that the described embodiments are merely some rather than all of the embodiments of the present disclosure. Based on the embodiments of the present disclosure, other embodiments acquired by those of ordinary skilled in the art without creative effort all belong to the protection scope of the present disclosure.

Figure 1:
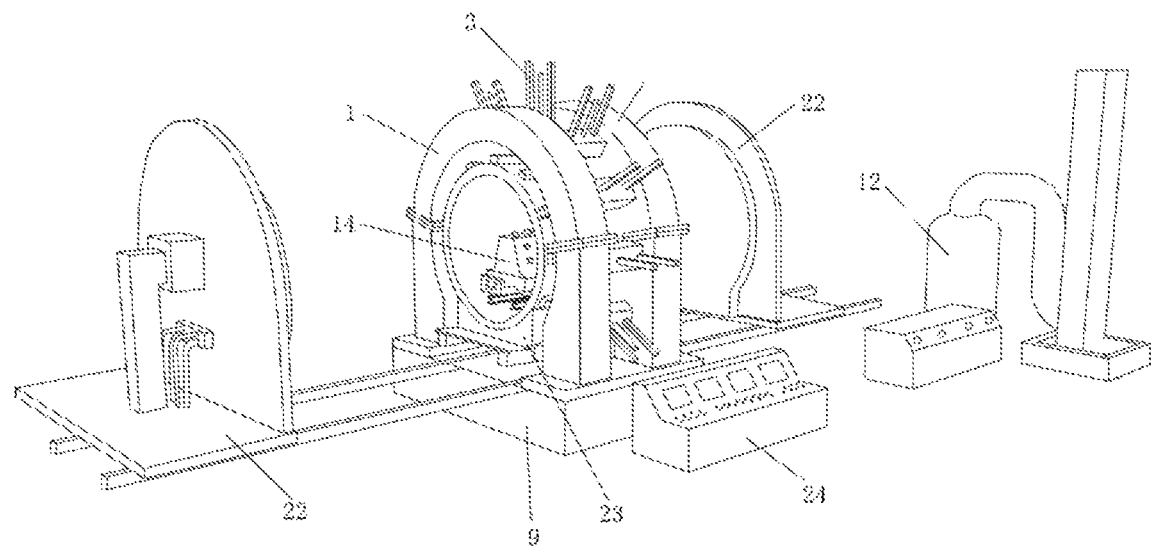
FIG. 1 illustrates a schematic diagram of a fire testing system having loading within a multi-dimensional space for a tunnel structure provided by an embodiment of the present disclosure.
Figure 2:
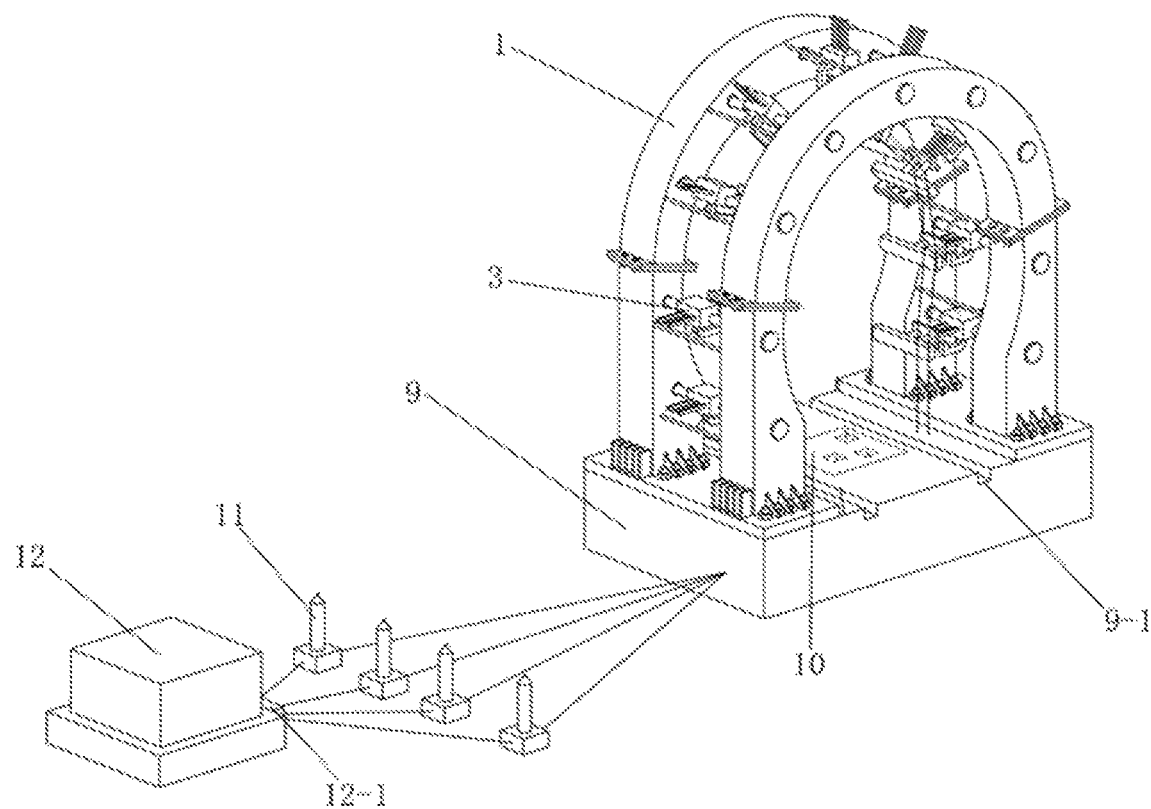
FIG. 2 illustrates a schematic diagram of a multi-point loading self-balancing reaction force system with adjustable loading positions provided by an embodiment of the present disclosure.
Figure 3:
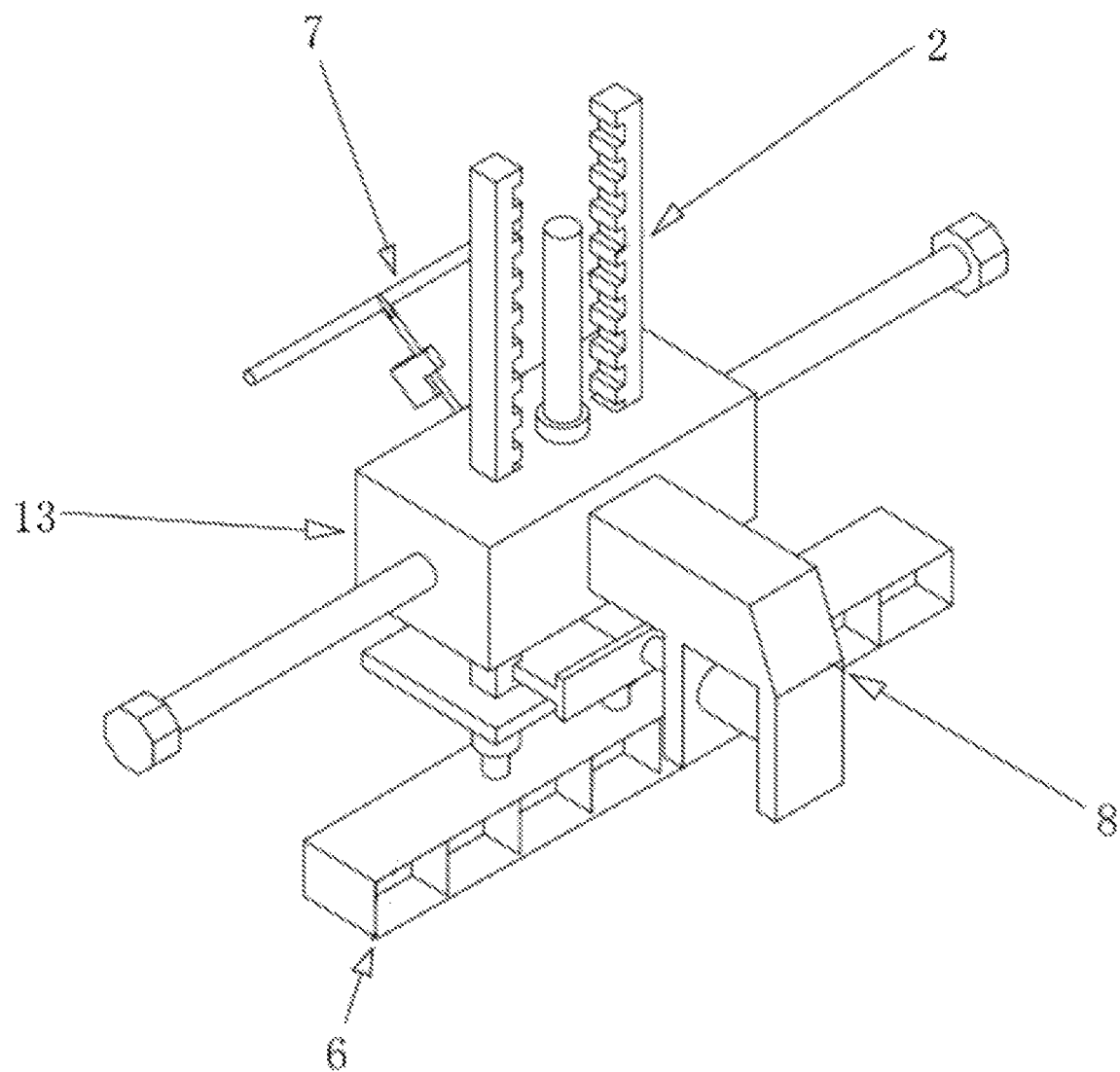
FIG. 3 illustrates a schematic diagram of a self-adaptive loading apparatus provided by an embodiment of the present disclosure.
Figure 4:
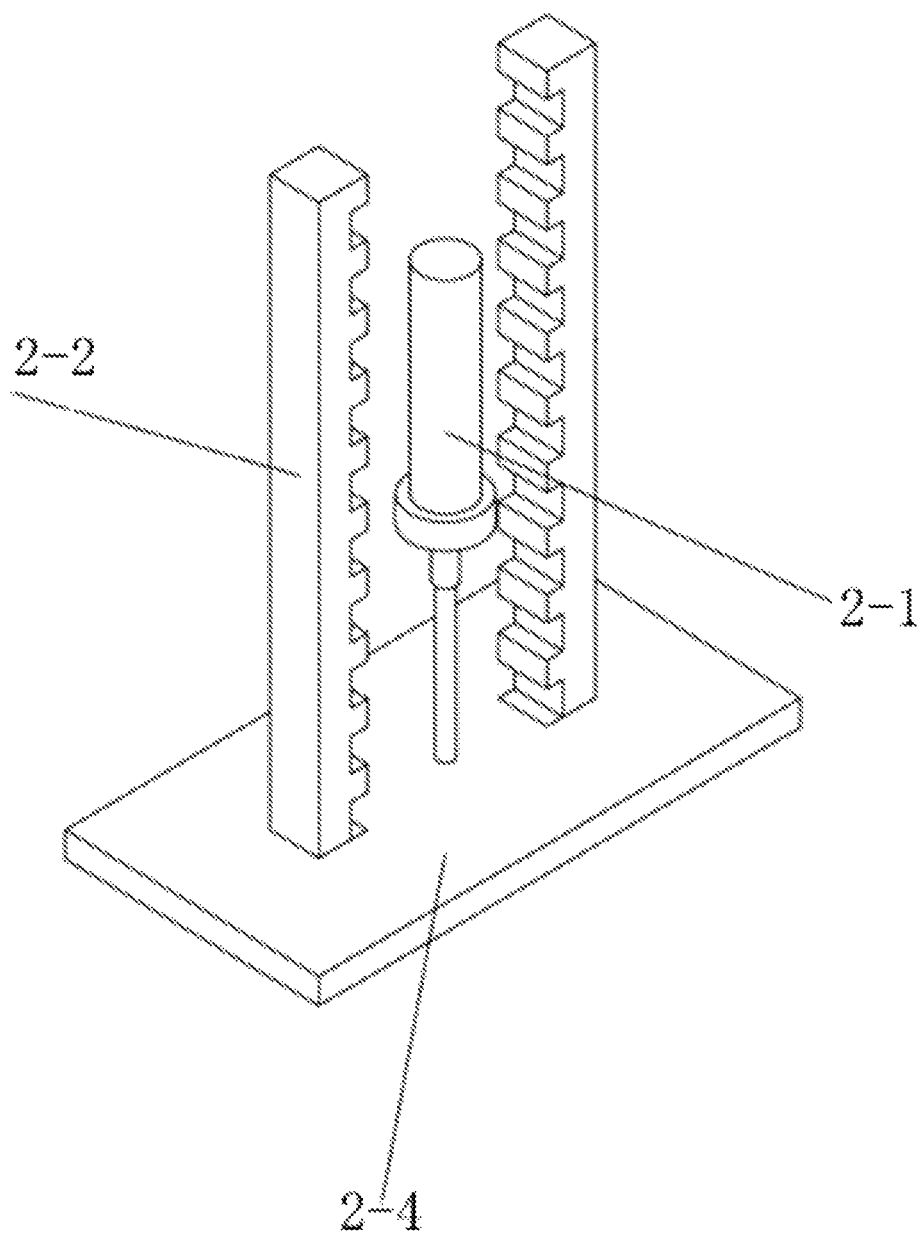
FIG. 4 illustrates a schematic diagram of a distance adjusting assembly provided by an embodiment of the present disclosure.
Figure 5:
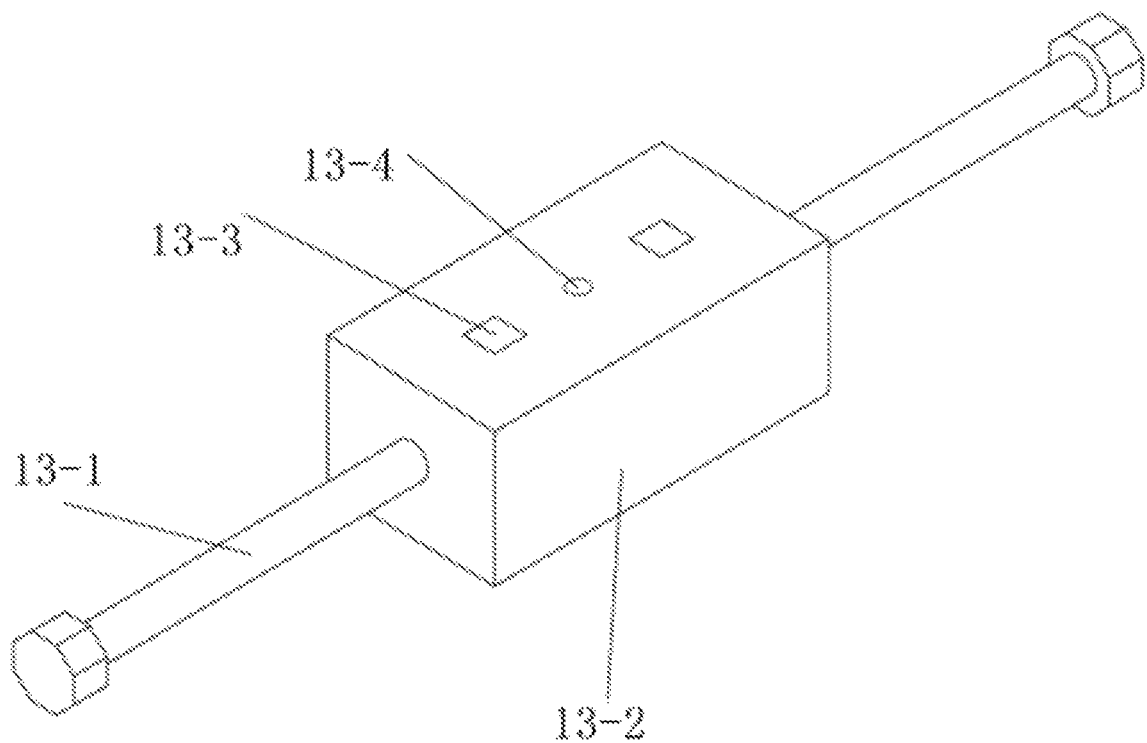
FIG. 5 illustrates a schematic diagram of a rotating-shaft assembly provided by an embodiment of the present disclosure.
Figure 6:
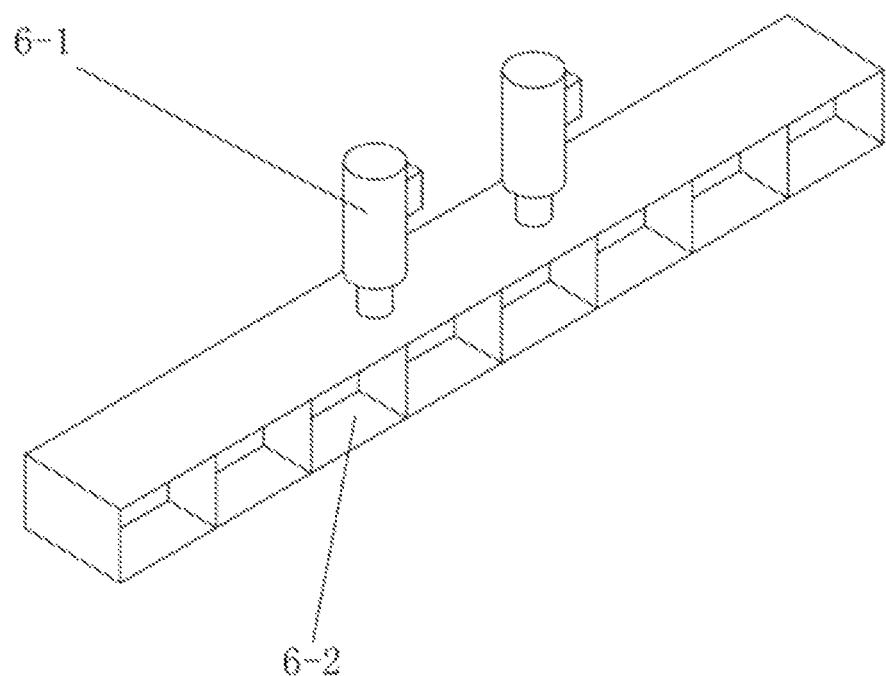
FIG. 6 illustrates a schematic diagram of a hydraulic cylinder loading assembly provided by an embodiment of the present disclosure.
Figure 7:
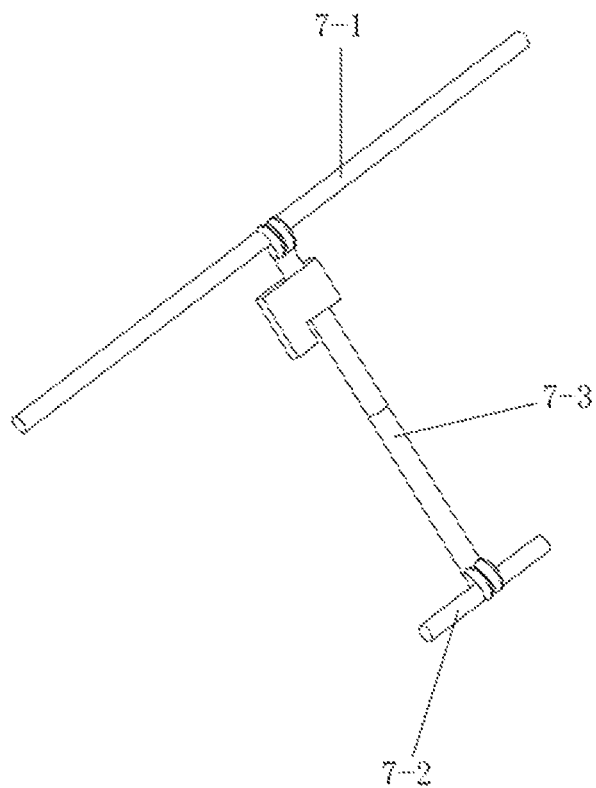
FIG. 7 illustrates a schematic diagram of an angle adjusting assembly provided by an embodiment of the present disclosure.
Figure 8:
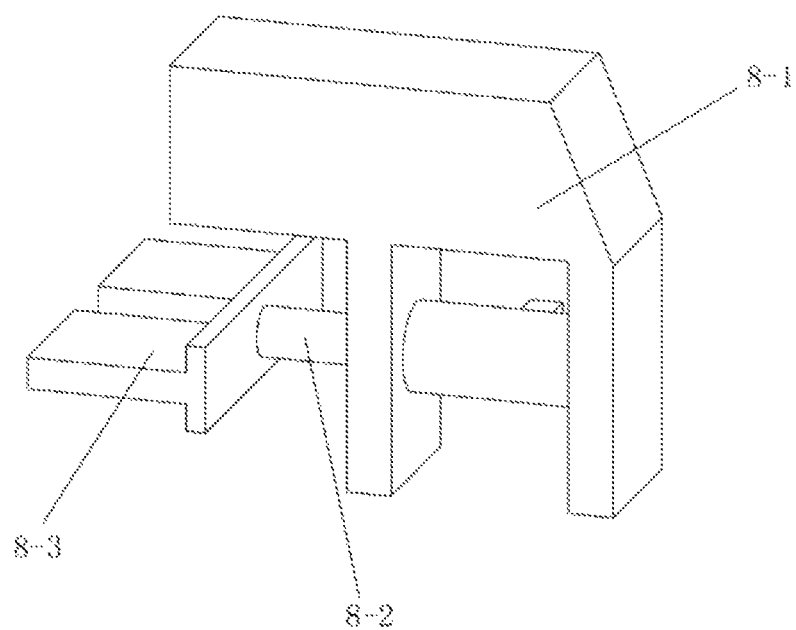
FIG. 8 illustrates a schematic diagram of a locking assembly provided by an embodiment of the present disclosure.
Figure 9:
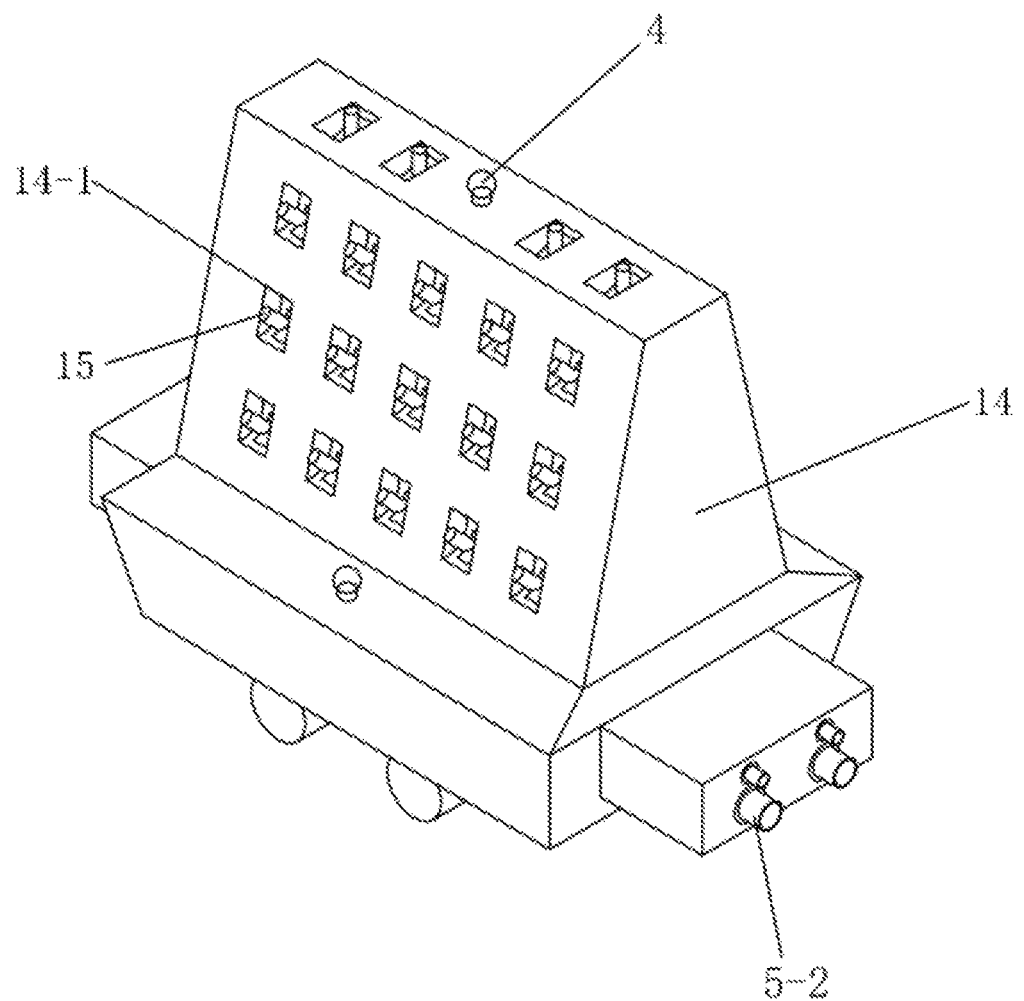
FIG. 9 illustrates a layout diagram of combustion ports on a tower-type combustion vehicle provided by an embodiment of the present disclosure.
Figure 10:
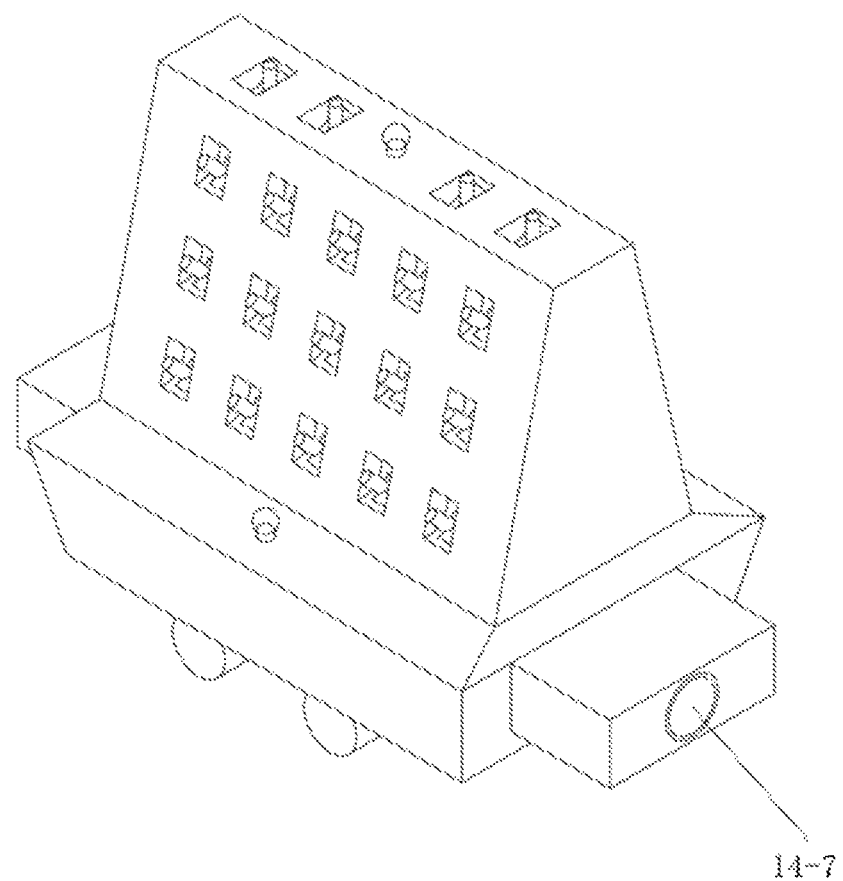
FIG. 10 illustrates a layout diagram of access ports on a tower-type combustion vehicle provided by an embodiment of the present disclosure.
Figure 11:
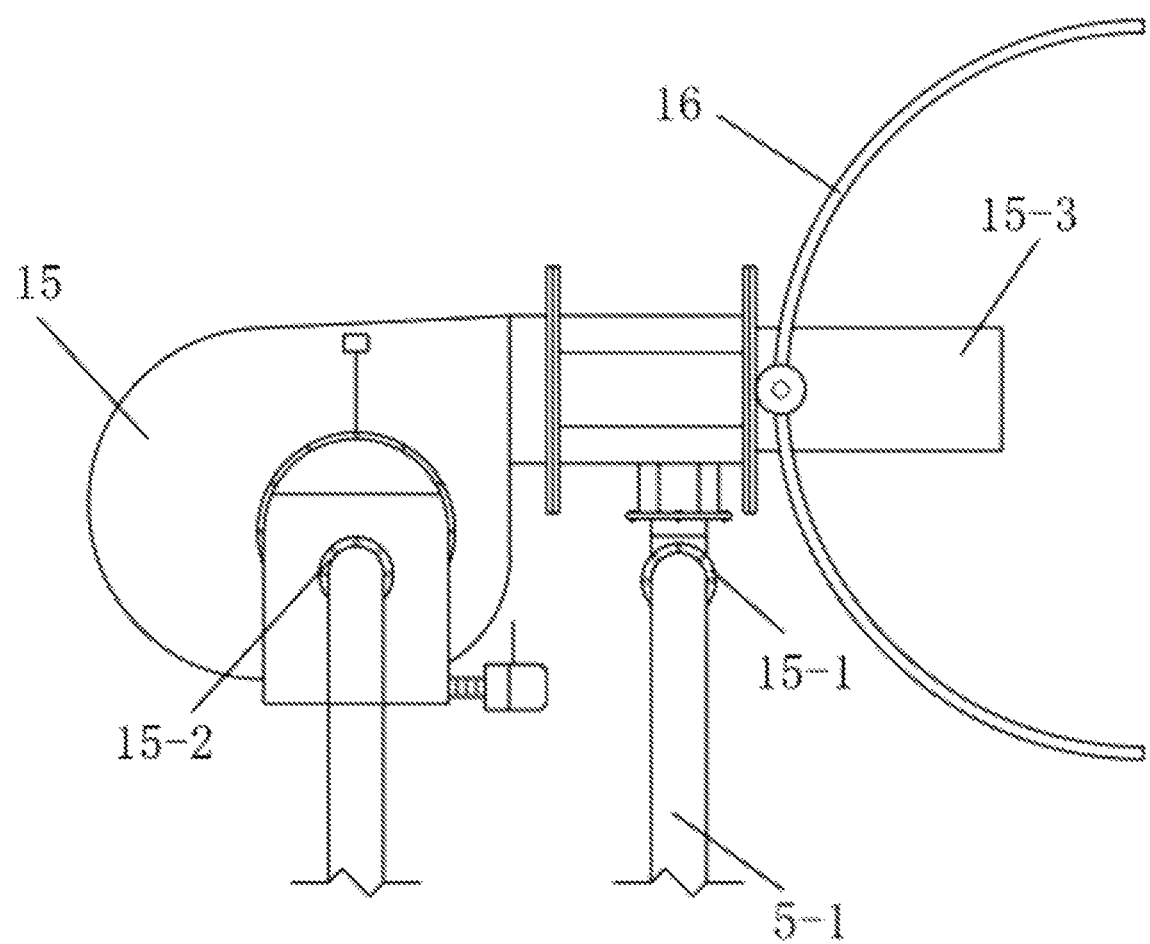
FIG. 11 illustrates a schematic diagram of a combustor provided by an embodiment of the present disclosure.
Figure 12:
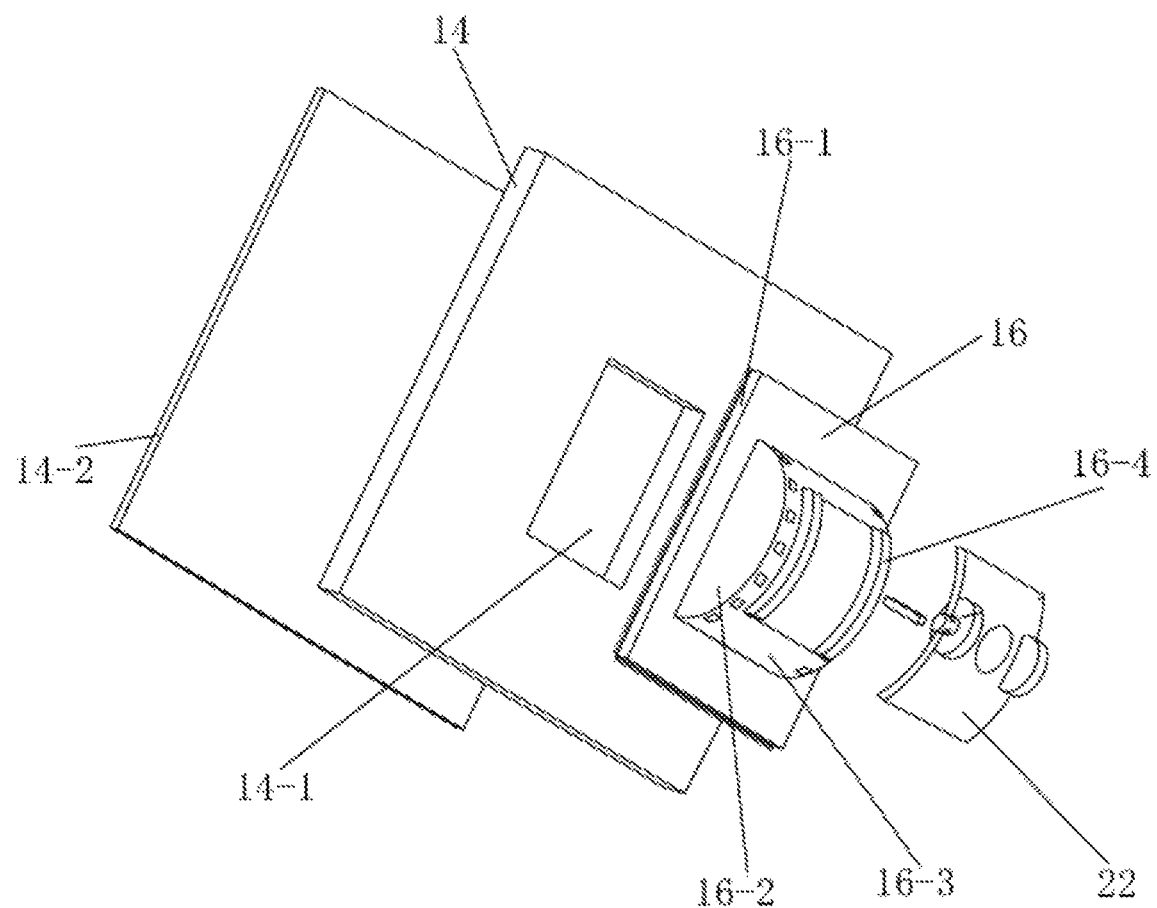
FIG. 12 illustrates a schematic diagram of a sliding portion of a combustor provided by an embodiment of the present disclosure.
Figure 13:
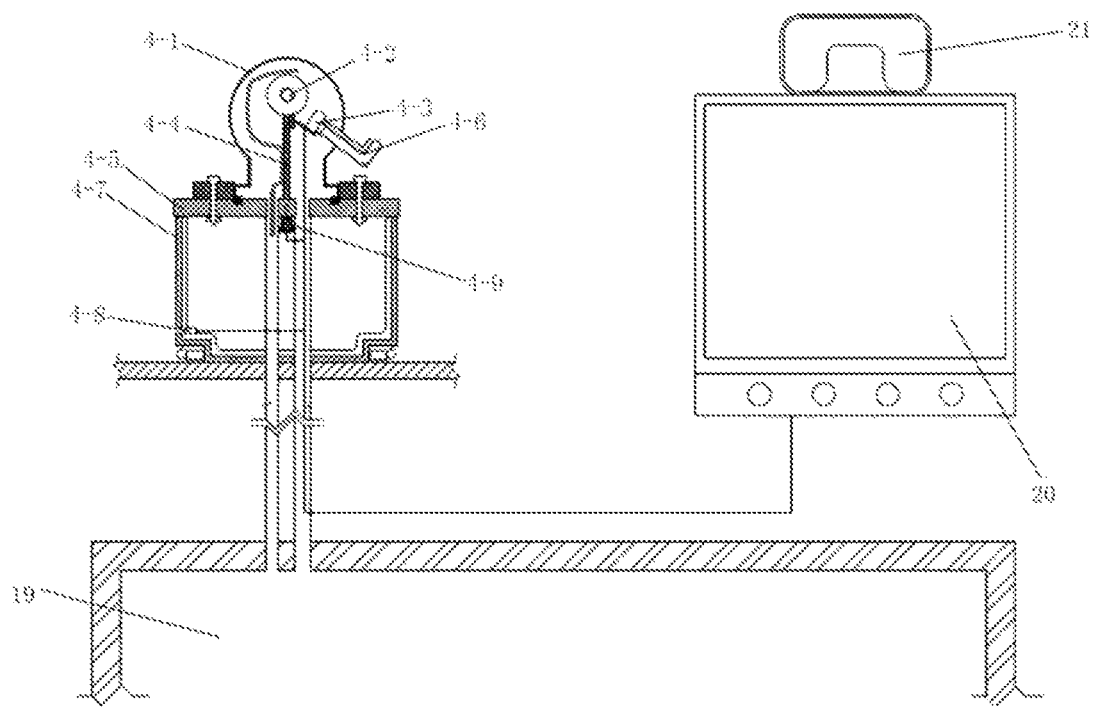
FIG. 13 illustrates a schematic diagram of a panoramic detection apparatus provided by an embodiment of the present disclosure.
Figure 14:
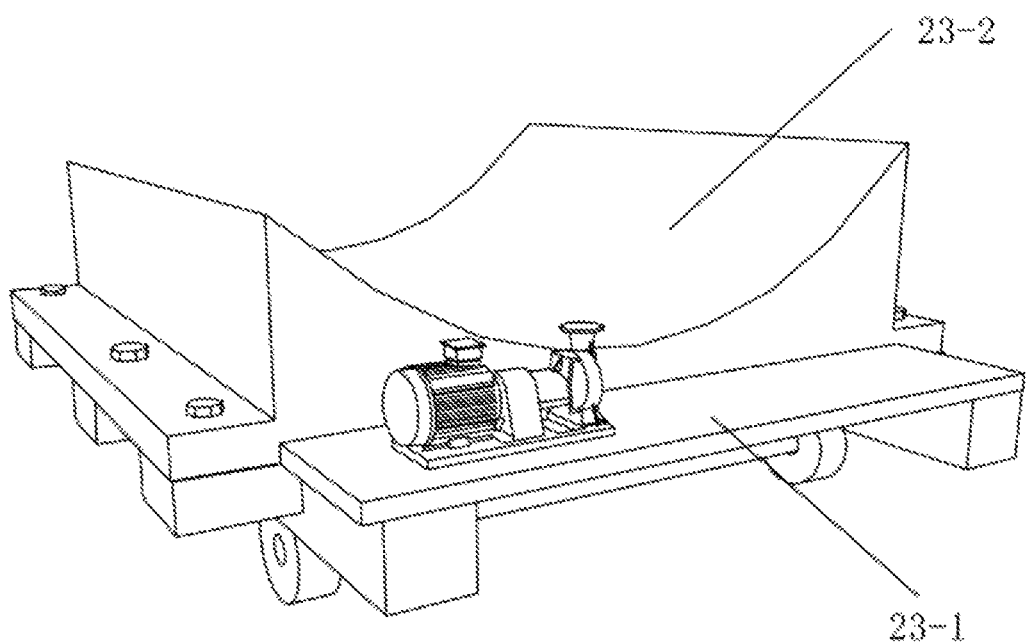
FIG. 14 illustrates a schematic diagram of a model assembly and transport apparatus provided by an embodiment of the present disclosure.

As illustrated in FIGS. 1 to 14, a testing fire system having loading within a multi-dimensional space for a tunnel structure includes a multi-point loading self-balancing reaction force system provided with a rigid platform 9, two reaction force frames 1 in an annular shape, self-adaptive loading apparatuses 3, distance adjusting assemblies 2, rotating-shaft assemblies 13, and hydraulic cylinder loading assemblies 6. Two reaction force frames 1 are arranged on the rigid platform 9 in parallel, and the reaction force frames are formed by connecting a plurality of segments of steel members through bolts. Each of the distance-adjusting assemblies 2 includes an electric pushing-rod 2-1, fixing rods 2-2 and an adjustment platform 2-4. Each of the rotating-shaft assemblies includes rotating rods 13-1 and a rotating block 13-2. Each of the hydraulic cylinder loading assemblies includes hydraulic cylinders 6-1 and a distribution beam 6-2.

Rail channels 9-1 are arranged on the rigid platform 9 and rails are laid in the rail channels. A slidable model assembly and transport apparatus 23 and two furnace body side-sealing apparatuses 22 are arranged on the rails. An upper end of the model assembly and transport apparatus 23 is configured to place a tunnel model, and two furnace body side-sealing apparatuses 22 are configured to seal both end openings of the tunnel model respectively. A steel rail is arranged on an inner wall of the tunnel model, a tower-type combustion vehicle capable of injecting a flame outwards is arranged on the steel rail. Two reaction force frames 1 are arranged on the rigid platform 9 in parallel, and a plurality of uniformly distributed sets of self-adaptive loading loading apparatuses 3 are configured to apply loading forces to an outer wall of the tunnel model are connected between the two reaction force frames 1. Loading ends of the self-adaptive loading apparatuses 3 are capable of freely adjusting spatial locations. The reaction force frames 1 are in an annular shape and are formed by connecting a plurality of segments of steel members through bolts. Each of the furnace body side-sealing apparatuses 22 is provided with an air inlet pipe, a wind inlet pipe, a water inlet pipe and a water outlet pipe, respectively.

Each of the self-adaptive loading apparatus 3 includes a distribution beam 6-2. A plurality of unifromly distributed hydraulic cylinders 6-1 are hinged on an upper end surface of the distribution beam 6-2. One end of each of the hydraulic cylinders 6-1 away from the distribution beam 6-2 is fixed to a bottom portion of the adjustment platform 2-4. An electric pushing rod 2-1 and two fixing rods 2-2 symmetrically arranged on both sides of the electric pushing rod 2-1 are fixed on a top surface of the adjustment platform 2-4. The fixing rods 2-2 and the electric pushing rod 2-1 are slidably connected with an rotating block 13-2. Two rotating rods 13-1 are symmetrically fixed on two ends of the rotating block 13-2. One end of each of the two rotating rods 13-1 away from the rotating block 13-2 is pinnedly connected into a pin hole preset on each of the two reaction force frames 1 respectively. Circular hole 13-4 and rectangular holes13-3 through which the electric pushing rod 2-1 and the fixing rods 2-2 pass are provided on the rotating block 13-2.

Each of the self-adaptive loading apparatuses 3 further includes an angle adjusting assembly 7 configured to adjust an rotation angle of the rotating block 13-2 and a locking assembly 8 configured to limit displacing of the distribution beam 6-2 in a direction of the fixing rods 2-2. A plurality of hydraulic supporting cylinders 10 are arranged on an upper end surface of the rigid platform 9, and each of the hydraulic cylinders 6-1 and each of the hydraulic supporting cylinders 10 are connected to a hydraulic power station 12 in an oil-way through a respective one of oil distribution stations 11, respectively.

The angel adjusting assembly 7 includes an adjusting top rod 7-1. A middle portion of the adjusting top rod 7-1 is connected to a middle portion of an adjusting bottom rod 7-2 through a first telescopic rod 7-3. Both ends of the adjusting top rod 7-1 are slidably inserted into grooves preset on the two reaction force frames 1 respectively. The adjusting bottom rod 7-2 is fixedly connected to the rotating block 13-2. The first telescopic rod drives the rotating block 13-2 to rotate through a stretch and contraction of the first telescopic rod 7-3. The electric pushing rod 2-1 and the first telescopic rod 7-3 are electrically controlled and are provided with a wireless receiving unit and a control unit controlling operations of the electric pushing rod 2-1 and the first telescopic rod 7-3, respectively.

The locking assembly 8 includes an L-shaped fixing frame 8-1 fixed on the rotating block 13-2. One end of the L-shaped fixing frame 8-1 away from the rotating block 13-2 is fixedly connected to a second telescopic rod 8-2. An extended end of the second telescopic rod 8-2 is fixedly connected to a rigid wedge 8-3. A side surface of each of the fixing rods 2-2 facing the electric pushing rod 2-1 is provided with a plurality of uniformly arranged grooves. Two sides of the rigid wedge 8-3 are capable of being embedded into the grooves to function with position locking with respect to the distribution beam 6-2. A middle portion of the rigid wedge 8-3 is provided with a notch capable of accommodating the electric pushing rod 2-1. And the second telescopic rod 8-2 is electrically controlled and is provide with a wireless receiving unit and a control unit controlling an operation of the second telescopic rod 8-2, respectively.

A hydraulic cylinder load sensor and A hydraulic cylinder displacement sensor are arranged on loading ends of the hydraulic supporting cylinder 10 and the hydraulic cylinder 6-1, respectively, and a hydraulic cylinder proportional valve is arranged between the hydraulic cylinder 6-1 and the hydraulic supporting cylinder 10, and corresponding oil distribution stations 11 respectively, so as to implement a respective independent hydraulic supply.

The tower-type combustion vehicle includes a vehicle body 14. A plurality of combustion ports 14-1 uniformly arranged in a rectangular array are arranged on two side surfaces and a top surface of the vehicle body 14, respectively. A plurality of sliding frames 16 corresponding to the combustion ports 14-1 in one-to-one respectively are fixed on an inner wall of the vehicle body 14. Sliding plates 22 are slidably connected with the sliding frames 16 and are fixedly connected with combustion cylinders 15-3 of combustors 15. Flame projecting ends of the combustion cylinders 15-3 pass through the sliding plates 22, the sliding frames 16 and the combustion ports 14-1, and protrude from the vehicle body 14. The combustion cylinders 15-3 are capable of swinging up and down for projecting through sliding the sliding plates 22 on the sliding frames 16. Air inlet holes 15-1 and wind inlet holes 15-2 on the combustors 15 are in communication with each other through the air inlet pipes and the wind inlet pipes of the furnace body side-sealing apparatuses 22, and heat-resistant hoses, respectively. The air inlet pipes and the wind inlet pipes are externally connected to an external gas 17 and a wind source respectively. A plurality of high-temperature-resistant panoramic detection apparatuses 4 are arranged an outer wall of the vehicle body 14, the panoramic detection apparatuses 4 are electrically connected with an external monitor 20, the monitor 20 is externally connected to a Virtual Reality (VR) apparatus 21, an inspection port 14-7 capable of accommodating a maintenance personally for access is arranged on one end of the vehicle body 14.

Each of the sliding frames 16 includes a wall plate 16-1 fixed on an inner wall of the vehicle body 14, an arc-shaped plate 16-3 is fixed on a side of the wall plate 16-1 away from the inner wall of the vehicle body 14, side plates 16-2 are fixed between arc-shaped edges on two sides of the arc-shaped plate 16-3 and the wall plate 16-1 for sealing, a respective one of the sliding plates 22 is slidably connected to a side surface of the arc-shaped plate 16-3 away from the wall plate 16-1 through arc-shaped sliding rails 16-4, an anti-sliding locking apparatus configured to limit displacing of the sliding plate 22 is further arranged on the sliding plate 22. The wall plate 16-1, the arc-shaped plate 16-3 and the sliding plate 22 are provided respectively with a slot that is adapted and in communication with a respective one of the combustion ports 14-1 and is configured for a respective one of the combustion cylinders 15-3 to pass through. The sliding plate 22 is fixedly connected to a bottom portion of the combustion cylinder 15-3. A portion of the sliding plates 13 covering the arc-shaped plate 16-3 has the same curvature as the arc-shaped plate 16-3.

Each of the panoramic detection apparatuses 4 includes a high-temperature-resistant spherical glass cover 4-1. The high-temperature-resistant spherical glass cover 4-1 is fixed on a pedestal 4-5 by a high-temperature-resistant clamp sleeved at a bottom portion of the spherical glass cover 4-1. A waterproof 360-degree camera 4-2 is arranged in the high-temperature-resistant spherical glass cover 4-1. The waterproof 360-degree camera 4-2 is fixed on an upper end surface of the pedestal 4-5 through a waterflow separator 4-2 arranged vertically. Two side edges of the waterflow separator 4-4 abut on an inner wall of the high-temperature-resistant spherical glass cover 4-1. A space between the waterproof 360-degree camera 4-2 and the pedestal 4-5 is divided into a left cavity and a right cavity through the waterflow separator 4-4. A distance-measuring thermal imager 4-3 is further arranged in the right cavity and is fixed on one end of an endoscope 4-6. Another end of the endoscope 4-6 is a peeping end and protrudes from the high-temperature-resistant spherical glass over 4-1. The left cavity and the right cavity are respectively in communication with the water inlet pipe and the water outlet pipe on a respective one of the furnace body side-sealing apparatuses 22 through heat resistant hoses. The water inlet pipe and the water outlet pipe are in communication with an external cooling pool 19. A thermal insulating cover 4-7 is further arrange on a bottom portion of the pedestal. A tiny microphone 4-8 and an electric motor 4-9 are fixed in an inner cavity of the thermal insulating cover 4-7, a bottom portion of the thermal insulating cover 4-7 is fixed on the vehicle body 14. The waterproof 360-degree camera 4-2, the distance-measuring thermal imager 4-3, the tiny microphone 4-8 and the electric motor 4-9 are electrically connected with the external monitor 20 respectively. The monitor 20 is externally connected with the Virtual Reality apparatus 21, a protruding shaft of the electric motor 4-9 is inserted into and fixed at a center of the pedestal 4-5, the connection wires are arranged in the water outlet pipe and the heat-resistant hoses, and the pedestal 4-5 is driven to rotate clockwise or counterclockwise by the forward or reverse rotation of the electric motor 4-9.

A front end of a gas main pipe 5-2 is connected to the gas 17. A gas main valve 5-3, a pressure gauge 5-4, a flowmeter 5-5 and a gas control main valve 5-6 are arranged on the gas main pipe 5-2 in sequence from front to rear. A plurality of gas sub pipes 5-1 are branched from a bottom end of the gas main pipe 5-2. Each of the gas sub pipes 5-1 is provided with a gas control sub valves 5-7. The air inlet holes 15-1 in the same row of the combustors 15 in the vehicle body 14 are connect to one gas sub pipe 5-1 through metal hoses. The gas main valve 5-3, the pressure gauge 5-4, the flowmeter 5-5, the gas control main valve 5-6 and the gas control sub valve 5-7 are electrically connected to an external gas control panel 5-8. The gas control panel 5-8 is electrically connected to the monitor 20. The gas sub pipe 5-1 is in communication with the inlet air hole 5-1 of the combustor 15 after passing through the inlet air pipe of a respective one of the furnace body side-sealing apparatuses (22).

The gas control main valve 5-3 is a V-shaped-notch ball valve, and the gas control main valve 5-3 is driven pneumatically. A valve positioning of the gas control main valve 5-3 is controlled by an analog output signal from a control system of the monitor 20. A positive displacement flowmeter is adopted as the flowmeter 5-5, the flowmeter 5-5 includes a frequency pulse counter, two thermistor temperature probes and two pressure sensors, the thermistor temperature probes and the pressure sensors are arranged in pairs at an inlet and an outlet of the flowmeter 5-5 respectively.

The model assembly and transport apparatus 23 includes a model assembling platform 23-2 and a model carrier loader 23-1 that are arranged up and down with respect to each other. The model assembling platform 23-2 is made of steel structure components and is provided with an arc-shaped component adapted with the tunnel model at an upper end of the model assembling platform 23-2. The model carrier loader 23-1 is connected to a bottom portion of the model assembling platform 23-2 by bolts, and the model carrier 23-1 is electrically driven.

Controllable split combustors are adopted as the combustors 15.

The combustion ports 14-1 are in a rectangle shape, and the sliding frames 16 are made by welding a plurality of austenitic chromium-nickel heat-resistant steel-plates.

A ripple attenuator 12-1 is arrange at a high pressure outlet of the hydraulic power station 12.

The vehicle body 14, the model assembly and transport apparatus 23, the furnace body side-sealing apparatuses 22, the thermal insulating cover 4-7 and the sliding frames 16 are all made of the austenitic chromium-nickel heat-resistant steel-plates, and the rigid platform 9 may be provided with reserved holes to facilitate pipeline installation.

Multilayer insulation cotton are arrange on an inner wall of the tunnel model, an outer wall of the vehicle body 14, one side of the furnace body side-sealing apparatus facing the tunnel model, an interior of the thermal insulating cover 4-7, and the insulation cotton is a polycrystalline mullite fiber cotton sprayed with a high temperature curing agent.

The monitor 20 and the VR apparatus are arranged on the controller 24.

This embodiment further provides a method for implementing a fire testing system having loading within the multi-dimensional space for the tunnel structure, which includes the following steps.

In Step 1, a model assembling platform 23-2 is hoisted to an upper portion of a model carrier loader 23-1, and the model assembling platform is connected with the model carrier loader 23-1 by bolts. A tunnel model is hoisted to the model assembling platform 23-2 in pieces by a bridge crane and the tunnel model is completed to be assembled on the model assembling platform 23-2. The hydraulic power station 12 is controlled by a console 24. A wireless transmitting unit which adapted with wireless receiving units on a first telescopic rod 7-3, an electric pushing rod 2-1 and a second telescopic rod 8-2 is arranged on the console.

In Step 2, The model carrier loader 23-1 is transported to an inner cavity of two reaction force frames 1 along rails. A plurality of hydraulic supporting cylinders 10 located outside wheels of the model carrier loader 23-1 are lifted to a lower surface of the model assembling platform 23-2 after transporting the tunnel model to a preset testing position, and then the hydraulic supporting cylinders are locked.

In Step 3, the model carrier loader 23-1 is separated from the model assembling platform 23-2. The model carrier loader 23-1 is moved out of the test working position. A plurality of hydraulic supporting cylinders 10 located inside the wheels of the model carrier loader 23-1 are lifted to a lower surface of the model assembling platform 23-2, and then the hydraulic supporting cylinders 10 are locked.

In Step 4, an angel adjusting assembly 7 on the self-adaptive loading apparatus 3 stretches and contracts the rod body of the first telescopic 7-3 according an angle requirement on loading points of the test model, thereby driving the rotation of the rotating block 13-2 to implement the angle adjustment of the self-adaptive loading apparatus 3. A wireless signal is sent out through the console 24, the wireless receiving unit corresponding to the first telescopic rod 7-3 receives the signal, and then transmits the signal to the corresponding control unit, and the control unit controls the first telescopic rod 7-3 to work.

In Step 5, after the angle adjustment is completed, according to a dimension of the test model, the distance adjusting assembly 7 stretches and contracts the rod body of the electric pushing rod 2-1, so that the distribution beams 6-2 move along a direction of the fixing rod 2-2 to adjust the distance. A wireless signal is sent out through the external console 24, the wireless receiving unit corresponding to the electric pushing rod 2-1 receives the signal, and then transmits the signal to the corresponding control unit, and the control unit controls the electric pushing rod 2-1 to work.

In Step 6, after the distance adjustment is completed, the locking assembly 8 pushes out the rigid wedge 8-3 through the second telescopic rod 8-2 and inserts the rigid wedge 8-3 into the grooves on the fixing rods 2-2 to implement a locking function of the loading positions. A wireless signal is sent out through the external console 24, the wireless receiving unit corresponding to the second telescopic rod 8-2 receives the signal, and then transmits the signal to the corresponding control unit, and the control unit controls the second telescopic rod 8-2 to work.

In Step 7, loading ends of a plurality of hydraulic cylinders 6-1 on the distribution beams 6-2 are controlled to extend, a preloading and a formal loading on the tunnel model are performed by the distribution beams 6-2, the distribution beams 6-2 are flexibly connected to the tunnel model.

In Step 8, a tower-type combustion vehicle is driven into the tunnel model along steel rails. After the tower-type combustion vehicle reaches a preset position, two furnace body side-sealing apparatuses 22 are respectively moved at two reaction force frames 1 along the rail. After a fire protection and a heat insulation are completed, the two furnace body side-sealing apparatuses 22 are closed, the two furnace body side-sealing apparatuses are inserted into two end openings of the tunnel model, and a fire temperature filed is applied to an interior of the tunnel model to perform a fire test.

It will be apparent that those skilled in the art can make various modifications and variations to the present disclosure without departing from the spirit and scope of the present disclosure. Thus, if these modifications and variations to the present disclosure fall within the scope of the appended claims and its equivalent technology, the present disclosure is also intended to cover these modifications and variations.

What is claimed is:

1. A fire testing system having loading within a multi-dimensional space for a tunnel structure, wherein the system comprises a multi-point loading self-balancing reaction force system provided with a rigid platform (9), rail channels (9-1) are arranged on the rigid platform (9) and rails are laid in the rail channels, a slidable model assembly and transport apparatus (23) and two furnace body side-sealing apparatuses (22) are arranged on the rails, an upper end of the model assembly and transport apparatus (23) is configured to place a tunnel model, the two furnace body side-sealing apparatuses (22) are configured to seal both end openings of the tunnel model respectively, a steel rail is arranged on an inner wall of the tunnel model, a tower-type combustion vehicle capable of projecting a flame outwards is arranged on the steel rail, the multi-point loading self-balancing reaction force system includes two reaction force frames arranged in parallel to each other on the rigid platform (9), a plurality of uniformly distributed sets of self-adaptive loading apparatuses (3) configured to apply loading forces to an outer wall of the tunnel model are connected between the two reaction force frames (1), loading ends of the self-adaptive loading apparatuses (3) are capable of freely adjusting spatial locations, the reaction force frames (1) are in an annular shape and are formed by connecting a plurality of segments of steel members through bolts, and each of the furnace body side-sealing apparatuses (22) is provided with an air inlet pipe, a wind inlet pipe, a water inlet pipe and a water outlet pipe respectively;

each of the self-adaptive loading apparatuses (3) includes a distribution beam (6-2), a plurality of uniformly distributed hydraulic cylinders (6-1) are hinged on an upper end surface of the distribution beam (2), one end of each of the hydraulic cylinders (6-1) away from the distribution beam (6-2) is fixed to a bottom portion of an adjustment platform (2-4), an electric pushing rod (2-1) and two fixing rods (2-2) symmetrically arranged on both sides of the electric pushing rod (2-1) are fixed on a top surface of the adjustment platform (2-4), the fixing rods (2-2) and the electric pushing rod (2-1) are slidably connected with a rotating block (13-2), two rotating rods (13-1) are symmetrically fixed on two ends of the rotating block (13-2), one end of each of the two rotating rods (13-1) away from the rotating block (13-2) is pinnedly connected into a pin hole preset on each of the two reaction force frames (1) respectively;

each of the self-adaptive loading apparatuses (3) further includes an angle adjusting assembly (7) configured to adjust a rotation angle of the rotating block (13-2) and a locking assembly (8) configured to limit displacing of the distribution beam (6-2) in a direction of the fixing rods (2-2), a plurality of hydraulic supporting cylinders (10) are arranged on an upper end surface of the rigid platform (9), each of the hydraulic cylinders (6-1) and each of the hydraulic supporting cylinders (10) are connected to a hydraulic power station (12) in an oil-way through a respective one of oil distribution stations (11), respectively.

2. The fire testing system having loading within the multi-dimensional space for the tunnel structure according to claim 1, wherein the angel adjusting assembly (7) comprises an adjusting top rod (7-1), a middle portion of the adjusting top rod (7-1) is connected to a middle portion of an adjusting bottom rod (7-2) through a first telescopic rod (7-3), both ends of the adjusting top rod (7-1) are slidably inserted into grooves preset on the two reaction force frames (1) respectively, the adjusting bottom rod (7-2) is fixedly connected to the rotating block (13-2), the first telescopic rod (7-3) drives the rotating block (13-2) to rotate through a stretch and contraction of the first telescopic rod (7-3), the electric pushing rod (2-1) and the first telescopic rod (7-3) are electrically controlled and are provided with a wireless receiving unit and a control unit controlling operations of the electric pushing rod (2-1) and the first telescopic rod (7-3), respectively.

3. The fire testing system having loading within the multi-dimensional space for the tunnel structure according to claim 1, wherein the locking assembly (8) comprises an L-shaped fixing frame (8-1) fixed on the rotating block (13-2), one end of the L-shaped fixing frame (8-1) away from the rotating block (13-2) is fixedly connected to a second telescopic rod (8-2), an extended end of the second telescopic rod (8-2) is fixedly connected to a rigid wedge (8-3), a side surface of each the fixing rods (2-2) facing the electric pushing rod (2-1) is provided with a plurality of uniformly arranged grooves, two sides of the rigid wedge (8-3) are capable of being embedded into the grooves to function with position locking with respect to the distribution beam (6-2), a middle portion of the rigid wedge (8-3) is provided with a notch capable of accommodating the electric pushing rod (2-1), the second telescopic rod (8-2) is electrically controlled, and is provided with a wireless receiving unit and a control unit controlling an operation of the second telescopic rod (8-2), respectively.

4. The fire testing system having loading within the multi-dimensional space for the tunnel structure according to claim 1, wherein a hydraulic cylinder load sensor and a hydraulic cylinder displacement sensor are arranged on loading ends of the hydraulic supporting cylinder (10) and the hydraulic cylinder (6-1) respectively, a hydraulic cylinder proportional valve is arranged between the hydraulic cylinder (6-1) and the hydraulic supporting cylinder (10), and corresponding oil distribution stations (11) respectively, to implement a respective independent hydraulic supply.

5. The fire testing system having loading within the multi-dimensional space for the tunnel structure according to claim 1, wherein the tower-type combustion vehicle comprises a vehicle body (14), a plurality of combustion ports (14-1) uniformly arranged in a rectangular array are arranged on two side surfaces and a top surface of the vehicle body (14) respectively, a plurality of sliding frames (16) corresponding to the combustion ports (14-1) one-to-one respectively are fixed on an inner wall of the vehicle body (14), sliding plates (22) are slidably connected with the sliding frames (16) and are fixedly connected with combustion cylinders (15-3) of combustors (15), flame projecting ends of the combustion cylinders (15-3) pass through the sliding plates (22), the sliding frames (16) and the combustion ports (14-1), and protrude from the vehicle body (14), the combustion cylinders (15-3) are capable of swinging up and down for projecting through sliding the sliding plates (22) on the sliding frames (16), air inlet holes (15-1) and wind inlet holes (15-2) of the combustors (15) are in communication with each other through the air inlet pipes and the wind inlet pipes of the furnace body side-sealing apparatuses (22), and heat-resistant hoses respectively, the air inlet pipes and the wind inlet pipes are externally connected to an external gas (17) and a wind source respectively, a plurality of high-temperature-resistant panoramic detection apparatuses (4) are arranged an outer wall of the vehicle body (14), the panoramic detection apparatuses (4) are electrically connected with an external monitor (20), the monitor (20) is externally connected to a Virtual Reality apparatus (21), and an inspection port (14-7) capable of accommodating a maintenance personnel for access is arranged on one end of the vehicle body (14).

6. The fire testing system having loading within the multi-dimensional space for the tunnel structure according to claim 5, wherein each of the sliding frames (16) comprises a wall plate (16-1) fixed on the inner wall of the vehicle body (14), an arc-shaped plate (16-3) is fixed on a side of the wall plate (16-1) away from the inner wall of the vehicle body (14), side plates (16-2) are fixed between arc-shaped edges on two sides of the arc-shaped plate (16-3) and the wall plate (16-1) for sealing, a respective one of the sliding plates (22) is slidably connected to a side surface of the arc-shaped plate (16-3) away from the wall plate (16-1) through arc-shaped sliding rails (16-4), an anti-sliding locking apparatus configured to limit displacing of the sliding plate (22) is further arranged on the sliding plate (22), the wall plate (16-1), the arc-shaped plate (16-3) and the sliding plate (22) are provided respectively with a slot that is adapted and in communication with a respective one of the combustion ports (14-1) and is configured for a respective one of the combustion cylinders (15-3) to pass through, the sliding plate (22) is fixedly connected to a bottom portion of the combustion cylinder (15-3), and a portion of the sliding plate (13) covering the arc-shaped plate (16-3) has a same curvature as the arc-shaped plate (16-3).

7. The fire testing system having loading within the multi-dimensional space for the tunnel structure according to claim 5, wherein each of the panoramic detection apparatus (4) comprises a high-temperature-resistant spherical glass cover (4-1), the high-temperature-resistant spherical glass cover (4-1) is fixed on a pedestal (4-5) by a high-temperature-resistant clamp sleeved at a bottom portion of the high-temperature-resistant spherical glass cover (4-1), a waterproof 360-degree camera (4-2) is arranged in the high-temperature-resistant spherical glass cover (4-1), the waterproof 360-degree camera (4-2) is fixed on an upper end surface of the pedestal (4-5) through a waterflow separator (4-4) arranged vertically, two side edges of the waterflow separator (4-2) abut on an inner wall of the high-temperature-resistant spherical glass cover (4-1), a space between the waterproof 360-degree camera (4-2) and the pedestal (4-5) is divided into a left cavity and a right cavity through the waterflow separator (4-4), a distance-measuring thermal imager (4-3) is further arranged in the right cavity and is fixed on one end of an endoscope (4-6), another end of the endoscope (4-6) is a peeping end and protrudes from the high-temperature-resistant spherical glass cover (4-1), the left cavity and the right cavity are respectively in communication with the water inlet pipe and the water outlet pipe on a respective one of the furnace body side-sealing apparatuses (22) through the heat-resistant hoses, the water inlet pipe and the water outlet pipe are in communication with an external cooling pool (19), a thermal insulating cover (4-7) is further arranged on a bottom portion of the pedestal, a tiny microphone (4-8) and an electric motor (4-9) are fixed in an inner cavity of the thermal insulating cover (4-7), a bottom portion of the thermal insulating cover (4-7) is fixed on the vehicle body (14), the waterproof 360-degree camera (4-2), the distance-measuring thermal imager (4-3), the tiny microphone (4-8) and the electric motor (4-9) are electrically connected with the external monitor (20) respectively, the monitor (20) is externally connected with the Virtual Reality apparatus (21), a protruding shaft of the electric motor (4-9) is inserted into and fixed at a center of the pedestal (4-5), and the pedestal (4-5) is driven to rotate clockwise or counterclockwise by a forward or reverse rotation of the electric motor (4-9).

8. The fire testing system having loading within the multi-dimensional space for the tunnel structure according to claim 5, wherein a front end of a gas main pipe (5-2) is connected to the gas (17), a gas main valve (5-3), a pressure gauge (5-4), a flowmeter (5-5) and a gas control main valve (5-6) are arranged on the gas main pipe in sequence from front to rear, a plurality of gas sub pipes (5-1) are branched from a bottom end of the gas main pipe (5-2), each of the gas sub pipes (5-1) is provided with a gas control sub valve (5-7), the air inlet holes (15-1) in a same row of the combustors (15) in the vehicle body (14) are connect to one gas sub pipe (5-1) through metal hoses, the gas main valve (5-3), the pressure gauge (5-4), the flowmeter (5-5), the gas control main valve (5-6) and the gas control sub valve (5-7) are electrically connected to an external gas control panel (5-8), the gas control panel (5-8) is electrically connected to the monitor (20), the gas sub pipe (5-1) is in communication with the inlet air hole (15-1) of the combustor (15) after passing through the inlet air pipe of a respective one of the furnace body side-sealing apparatuses (22);

the gas main valve (5-3) is a V-shaped-notch ball valve, the gas main valve (5-3) is driven pneumatically, a valve positioning of the gas control main valve (5-3) is controlled by an analog output signal from a control system of the monitor (20), a positive displacement flowmeter is adopted as the flowmeter (5-5), the flowmeter (5-5) includes a frequency pulse counter, two thermistor temperature probes and two pressure sensors, and the thermistor temperature probes and the pressure sensors are arranged in pairs at an inlet and an outlet of the flowmeter (5-5) respectively.

9. The fire testing system having loading within the multi-dimensional space for the tunnel structure according to claim 1, wherein the model assembly and transport apparatus (23) comprises a model assembling platform (23-2) and a model carrier loader (23-1) that are arranged up and down with respect to each other, the model assembling platform (23-2) is made of steel structure components and is provided with an arc-shaped component adapted with the tunnel model at an upper end of the model assembling platform (23-2), the model carrier loader (23-1) is connected to a bottom portion of the model assembling platform (23-2) by bolts, and the model carrier loader (23-1) is electrically driven.

10. A method for implementing a fire testing system having loading within the multi-dimensional space for the tunnel structure, wherein the method specifically comprises following steps:

Step 1, hoisting a model assembling platform (23-2) to an upper portion of a model carrier loader (23-1), and connecting the model assembling platform (23-2) with the model carrier loader (23-1) by bolts, hoisting, by a bridge crane, a tunnel model to the model assembling platform (23-2) in pieces, and completing assembling the tunnel model on the model assembling platform (23-2), wherein a hydraulic power station (12) is controlled by a console (24), and a wireless transmitting unit adapted with wireless receiving units on a first telescopic rod (7-3), an electric pushing rod (2-1) and a second telescopic rod (8-2) is arranged on the console (24);

Step 2, transporting the model carrier loader (23-1) to an inner cavity of two reaction force frames (1) along rails, lifting, after transporting the tunnel model to a preset testing position, a plurality of hydraulic supporting cylinders (10) located outside wheels of the model carrier loader (23-1) to a lower surface of the model assembling platform (23-2) and then locking the hydraulic supporting cylinders (10);

Step 3, separating the model carrier loader (23-1) from the model assembling platform (23-2), moving the model carrier loader (23-1) out of the test working position, lifting a plurality of hydraulic supporting cylinders (10) located inside the wheels of the model carrier loader (23-1) to a lower surface of the model assembling platform (23-2), and locking the hydraulic supporting cylinders (10);

Step 4, emitting, by the console (24) and according to an angle requirement on loading points of the test model, a signal to control stretch and contraction of the first telescopic rod (7-3) to thus drive the rotating block (13-2) to rotate, thereby adjusting, through an angel adjusting assembly (7) on a self-adaptive loading apparatus (3), an angle of the self-adaptive loading apparatus (3);

Step 5, emitting, by the console (24), and according to a dimension of the test model, a signal after adjusting the angle to control the stretch and contraction of the electric pushing rod (2-1), thereby moving, through a distance adjusting assembly (7), a distribution beam (6-2) along a direction of fixing rods (2-2) to adjust a distance;

Step 6, emitting, by the console (24), a signal after adjusting the distance to control and push a rigid wedge (8-3) out through the second telescopic rod (8-2), and inserting the rigid wedge (8-3) into grooves on the fixing rods (2-2), thereby implementing, through a locking assembly (8), a locking function of loading positions;

Step 7, controlling loading ends of a plurality of hydraulic cylinders (6-1) on the distribution beams (6-2) to extend, performing, by the distribution beams (6-2), a preloading and a formal loading on the tunnel model, flexibly attaching the distribution beams (6-2) to the tunnel model; and Step 8, driving a tower-type combustion vehicle into the tunnel model along steel rails, moving, after the tower-type combustion vehicle reaches a preset position, two furnace body side-sealing apparatuses (22) at two reaction force frames (1) along the rail, respectively, closing, after completing a fire protection and a thermal insulation, the two furnace body side-sealing apparatuses (22), inserting the two furnace body side-sealing apparatuses (22) into two end openings of the tunnel model, and applying a fire temperature field to an interior of the tunnel model to perform a fire test.

\* \* \* \* \*